Dec. 12, 1933.  W. A. COLE ET AL  1,938,952
APPARATUS FOR ROOT PRUNING AND TREE DIGGING
Filed May 31, 1930   3 Sheets-Sheet 1
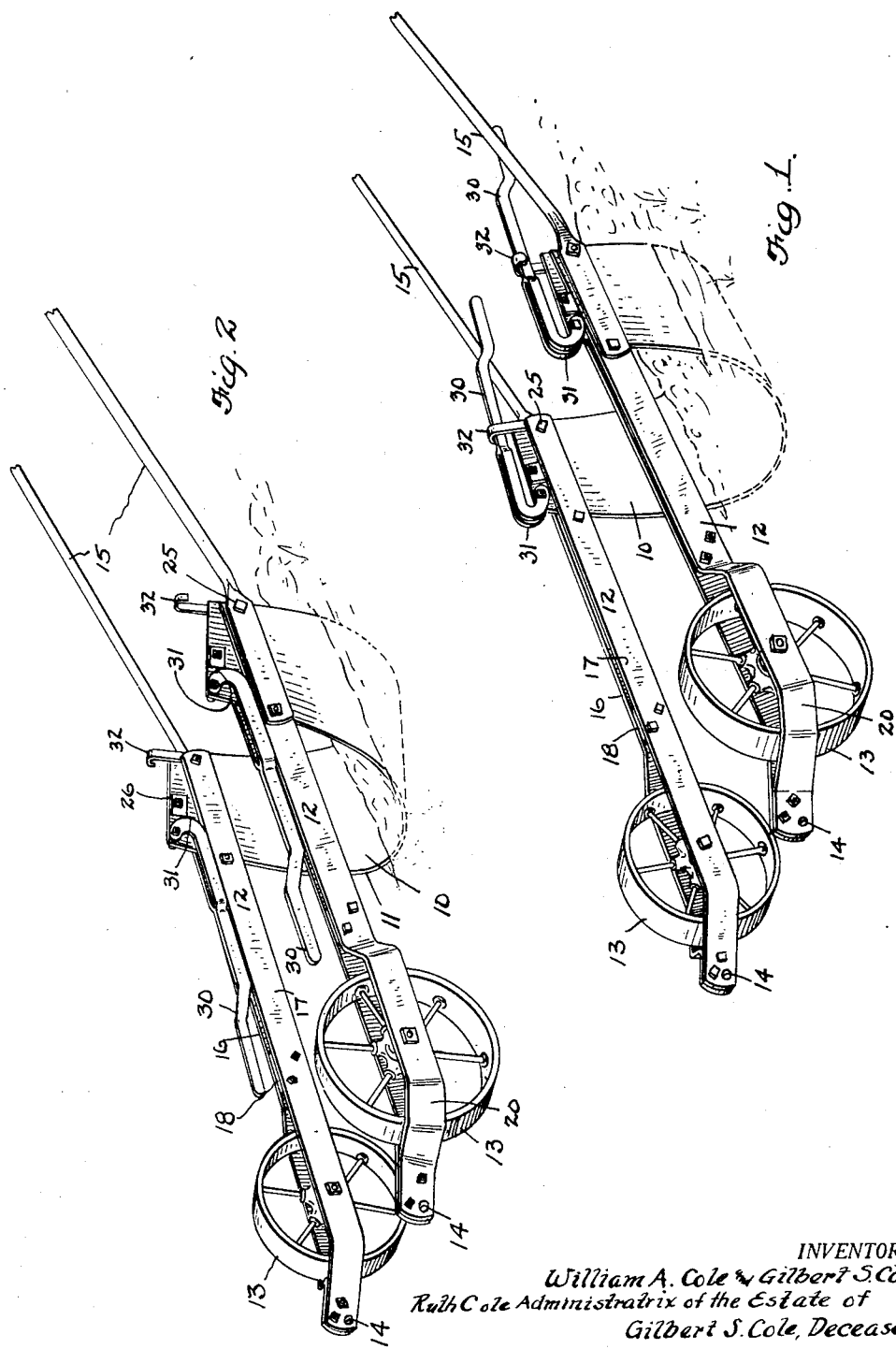
INVENTORS
William A. Cole & Gilbert S. Cole.
Ruth Cole Administratrix of the Estate of
Gilbert S. Cole, Deceased
by Day, Oberlin & Day
ATTORNEYS.

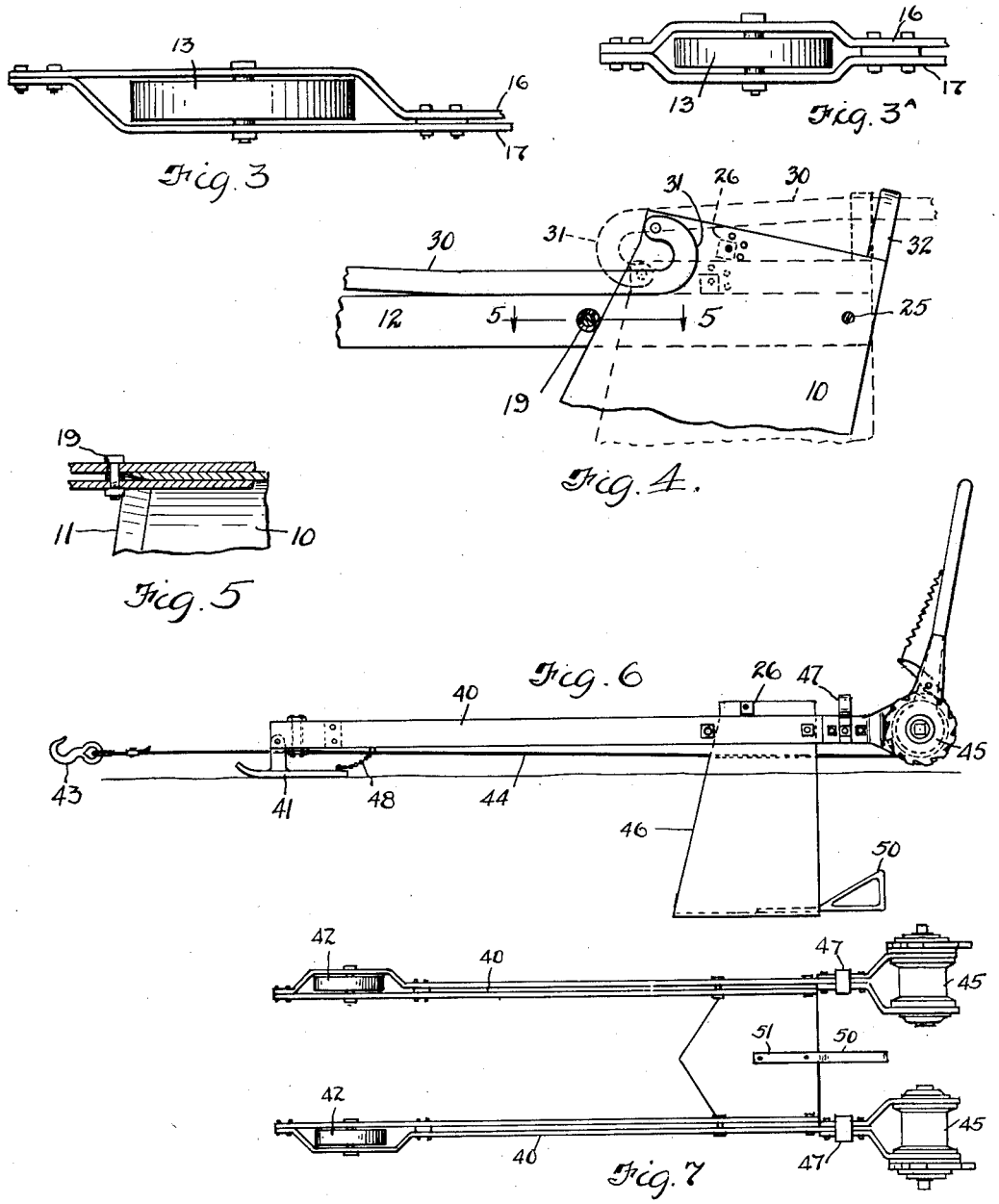

Dec. 12, 1933.   W. A. COLE ET AL   1,938,952
APPARATUS FOR ROOT PRUNING AND TREE DIGGING
Filed May 31, 1930   3 Sheets-Sheet 3
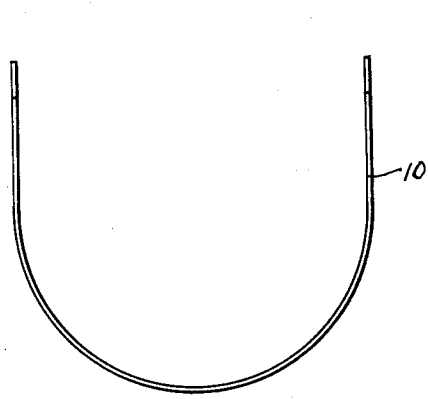
Fig. 9
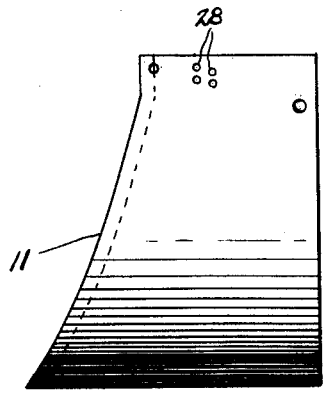
Fig. 10
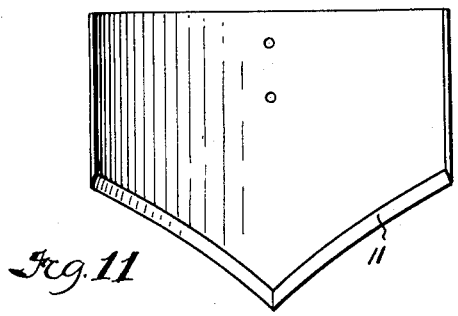
Fig. 11
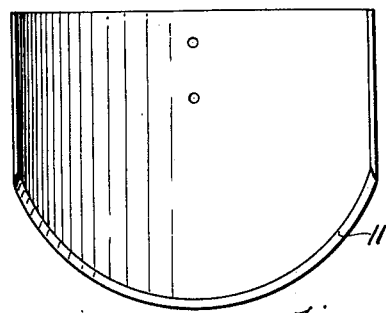
Fig. 12
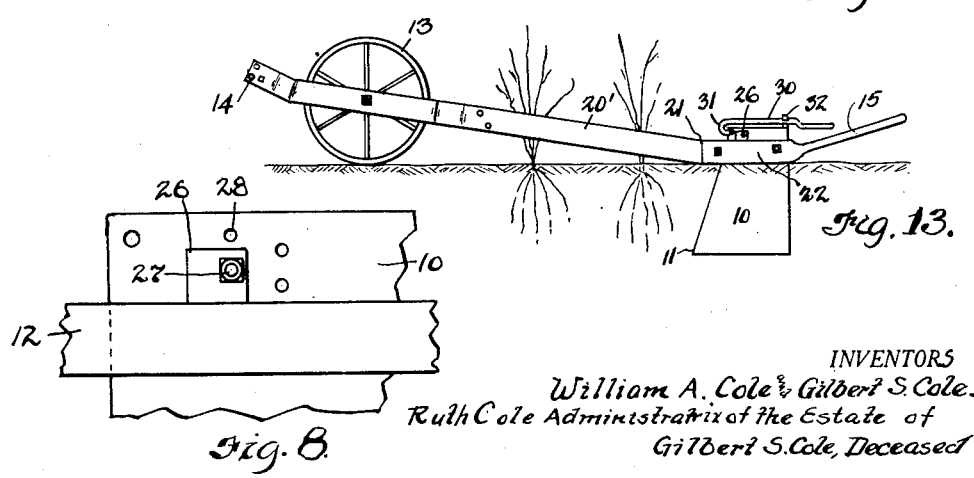
Fig. 13.
Fig. 8.
INVENTORS
William A. Cole & Gilbert S. Cole.
Ruth Cole Administratrix of the Estate of
Gilbert S. Cole, Deceased
by Fay, Oberlin & Fay ATTORNEYS.

Patented Dec. 12, 1933

1,938,952

UNITED STATES PATENT OFFICE 1,938,952

APPARATUS FOR ROOT PRUNING AND TREE DIGGING

William A. Cole, Painesville, and Gilbert S. Cole, deceased, late of Painesville, Ohio, by Ruth Cole, administratrix, Painesville, Ohio, assignors to The Cole Nursery Company, Painesville, Ohio, a corporation of Ohio Application May 31, 1930. Serial No. 458,769

11 Claims. (Cl. 55—18)

This invention relates to a means for pruning the roots of plants and small trees in nurseries and provides means whereby such root-pruning may be accomplished accurately and expeditiously without damage to the trunks or foliage and with a minimum of disturbance to the soil between the rows and consequently without waste of power and unnecessarily agitating the earth. Further objects of the invention are the production of such apparatus in simple form easily manufactured and of rugged construction; arranged to be made in various sizes according to the requirements of the situation, and to be operated either by horse-power or mechanically; designed to retain its position in the earth with a minimum of guidance; capable of being removed from the earth with relatively slight effort; and adapted to have attachments affixed thereto whereby the same apparatus may be employed to uproot plants when desired. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Fig. 1 is a perspective view of a small size of the apparatus in its operating position; Fig. 2 is a similar view of the same showing the blade out of operative position and just coming out of the ground; Figs. 3, 3A, 4 and 5 are detail views of the apparatus shown in Figs. 1 and 2; Figs. 3 and 3A being modified wheel mountings, Fig. 4 illustrating means for tilting the blade, and Fig. 5 being a section on the line 5—5 of Fig. 4; Fig. 6 is a side elevation of an apparatus for power operation; Fig. 7 is a plan of the same, but with a modified carriage; Fig. 8 is an enlarged detail of means to control the depth of the blade; Fig. 9 is a front elevation of a cutter blade; Fig. 10 is a side elevation of the same; Figs. 11 and 12 are plan views of two forms of blade; and Fig. 13 is a side elevation showing another form of side bar.

Referring now particularly to Figs. 1 to 5, inclusive, and Fig. 13, the small size of our pruner and digger adapted for horse or light power draft, comprises a blade element or cutter 10 of U-shape in transverse cross-section, and of substantial length, having a sharpened front edge 11 inclining backward on each side from an advanced center. The blade construction is particularly shown in Figs. 9 to 12, inclusive. This blade is mounted at its upper edges, which are the tops of the respective legs of the U, near the rear ends of a pair of independent parallel side bar members 12, each provided with a wheel 13 and draft connection, such as a hole 14, to receive a whiffletree clevis bolt at its front end, and a handle 15 at its rear end, and collectively forming a carriage. An uptilt of the side bar ahead of the wheel (see Figs. 1, 2 and 13) brings the application of the draft at 14 above the axle, preventing any tendency of the pull to lift the wheels off the ground. For convenience of construction and for additional stiffness, these side bars 12 may conveniently be composed of two separate bar stock elements 16 and 17, separated by spacer elements, such as blocks 18, bushings 19 or the like, between which the top edges of the blade 10 can move without binding. The elements 16 and 17 are further bent and separated at the forward end, as at 20, to provide a mounting and guard for the wheel 13.

A modified wheel mounting is shown in Fig. 3, which gives wide spacing to the whiffletrees, but with some tendency to spring the side bars inward because the line of draft is outside the direct forward line of the sides of the blade. A further modification shown in Fig. 3A spaces the whiffletrees wider than the wheel mounting shown in Figs. 1, 2 and 7, but retaining the advantage of a pull directly in line with the sides of the blade. It is important to have the whiffletrees spaced apart to avoid damage to the plants, inasmuch as the machine is operated with one side bar 12 on each side of the row.

The cutter blade 10 naturally tends to run horizontally in the ground. For this reason, in using the form of carriage shown in Fig. 1 the upper parts of the length of the blade 10 are not effective. To enable a deeper cut to be made with a blade of the same size, or an equally deep cut to be made with a smaller blade, we employ a form of carriage shown in Fig. 13. In this form the side bar construction differs from that of Fig. 1 in that the bar 20' is bent as at 21, so that the portion 22 to which the top of the blade 10 is attached lies parallel to the surface of the ground so that this portion 22 lies substantially on a geometrical tangent to the lower edge of the wheel 13. Thereby the blade 10 can run with almost the entire depth of each side underground, making a deeper cut with the same size blade than is possible with the straight side bars 12 of Fig. 1. The rear portion 22 of each side bar 20' is slightly bent upward so as to lie substantially parallel with and practically on the ground when the cutter is in deepest operating position.

In detail, the mounting of the cutter comprises a through pivot 25 near the rear of each side bar 12. This pivot 25 carries the upper rear edge of the cutter blade 10, permitting variation in the angle between the blade and the bars 12 or 20'. Lifting of the side bar 20' in running, or turning of the blade in a counterclockwise direction when starting, is prevented by a blade depth adjusting block 26 shown in detail in Fig. 8. This block, which is the embodiment of the "stopping means" of certain of the claims, is fastened by means of a pivot 27 well forward of the pivot 25 and sufficiently high so that any selected edge of the block will bear against the upper edge of the bar 12. The pivot 27 is eccentrically disposed, that is, it does not lie on either of the center lines of the rectangular block 26. Consequently, regulation of the depth of cut is accomplished by setting this block in any one of four possible positions, as illustrated in Fig. 8, where the distance from the pivot to each edge is different. Further adjustment is available by passing the pivot 27 through any of several holes 28, Figs. 8 and 10, at different heights. Thus in the form illustrated sixteen different depth adjustments are possible. In operation the blade 10 is constrained by its shape to travel horizontally and the angular adjustment is really of the carriage bars 12 or 20' with relation to the blade.

To avoid the necessity of a heavy direct lift to get the cutter out of the ground, a raising handle 30 is provided on each side above the respective side bar. These handles are pivoted near the upper front corners of the cutter, above the bars 12 and are curved to furnish cam surfaces 31, which, when the handles 30 are thrown forward from the position of Fig. 1 to the position of Fig. 2, (that is, from the dotted line positions of Fig. 4 to the solid line position of the same) will tilt the cutter 10 as shown, with the result that further forward movement pulls it out of the ground with no effort on the part of the operator, as shown in Fig. 2. Similarly, these handles 30 are grasped by the operator and used to start the cutter into the ground at the beginning of a row. The additional handles 15 are useful chiefly in loading the apparatus onto a wagon or in guiding it along the ground when it is being taken to or from work.

When the machine is taken to and from work the blade is in the position of Fig. 2, except that the rear edge of the blade is out and dragging along the surface of the ground. On account of the rounded form of the blade the machine, when running thus along the road, would naturally tend to rattle and shake its various parts loose if some means were not provided to counteract this. In order to prevent this and to hold the machine as a firm assembly at such times, the bushing 19, Figs. 4 and 5, is provided and is so set and so related to the blade 10 and to the forward position of the handle 30, that when the parts are in the solid line position of Fig. 4, the handle 30, forward edge of the blade 10, and the bushing 19 make a firm assembly. It will be understood that each of the side bars carries such a bushing 19.

Figs. 6 and 7 are, respectively, a side elevation and a plan view of a form of apparatus similar to that shown in Figs. 1 and 2, but of larger size and best adapted for power operation. This style has been practically operated under trees and shrubs up to about eight inches in diameter, although we do not limit ourselves to any particular size.

The features of this heavy duty form are side bars 40 of built-up construction, having at their forward end either runners 41 or wheels 42.

The method of operation of these is to pull the cutter by means hooked at 43 onto supplementary cables 44, one on each side of the device, these cables 44 being taken for a few turns around drums 45 at the rear of the machine. Ordinarily these drums are secured against rotation, but a short length of the cable 44 may be slacked off on either side. The cutter 46 in this form is similar in construction to the cutter 10 of the smaller sizes and may be shaped either as in Fig. 11, or in Fig. 12. It is adjustable for depth by means of a block 26, but does not have the handles 30 or anything similar thereto. Instead, eyes 47 are fitted to the side bars 40 at the rear of the cutter. When the apparatus comes to the end of a row, hooks from a power hoist are caught into the eyes 47 and the machine is thereby lifted and swung into its next position. In moving this device to and from work the usual method is to fasten the rear end up on a pair of wheels, or the rear end of a wagon and pull the device backwards. In order to keep the rear edges of the shoes 41 up under these conditions, chains 48 connect the rear end of the shoe with the side bar.

A lifter 50, consisting of a stout triangular frame fastened by a forward extension 51 to the center of the cutter bottom, is shown in place in Figs. 6 and 7. The base of the lifter is horizontal, having an upright at its rear end which supports the rear end of an upwardly and rearwardly inclined face. Similar lifters of appropriate size may be used in the form shown in Figs. 1 and 2. This lifter is not a permanent part of the machine, but is an attachment which is used when plants are to be up-rooted.

The form of the cutter blade is preferably U-shaped and the blade is always fairly long in the direction of travel, as best seen in Figs. 9 and 10. Since one purpose of the machine is to trim roots, the forward edge 11 is kept fairly sharp and is so shaped that an upward sliding motion will be given to any obstacles encountered. Obviously, this may be accomplished either by making the edge 11 of angular outline, as shown in Fig. 11, or of arcuate outline, as shown at 11', Fig. 12.

In the operation of the device, the machine is run down the row of trees or shrubs with one of the side elements of the carriage on each side of the row, the only connection between these two being by means of the cutter 10 which passes under the roots. In the small sizes a whiffletree is hooked into each of the holes 14 and as many horses as may be necessary hitched to each side. Of course, two tractors could be substituted for the horses, or when working on low shrubs a single tractor of the high straddling type could be used or any other suitable power.

The purpose of the root pruning is, of course, to prevent roots from growing too large and long on nursery stock which is to be transplanted.

When a row of stock is to be dug up, the cutter is run down the row in the same manner, but the digging attachment 50 is applied, thus lifting the plants partly up out of the ground. In pruning operations the idea is to avoid a breaking of ground as far as possible, while in digging, of course, just the opposite result is wanted.

Devices of a somewhat similar nature have been known for a long time, but one of the difficulties always encountered heretofore has been buried trash, loose roots, and so on which would accumulate on the front edge of the cutter, soon making progress impossible. One of the aims of our invention is to avoid this, which we accomplish by the blade form herein shown, an important feature of which is the inclination of the front edge backward and upward, which imparts an upward sliding action to such trash, thereby increasing the likelihood of cutting it below the surface, or bringing it to the surface in case it cannot be cut.

In the above description we have shown and described a light form of apparatus, as in Figs. 1, 2 and 14, for traction draft, that is to be pulled behind tractors or horses, and have also shown a heavy form, Figs. 6 and 7. It is, however, to be distinctly understood that we do not limit ourselves to any particular draft means, and that numerous combinations of elements and features are contemplated within the scope of our invention. For example, a pair of drums such as shown in Figs. 6 and 7, could be attached to the apparatus of Figs. 1 and 14; the handles 30 could be substituted for the eyes 47 to lift the blade of Fig. 6; skids 41 could be used on the light types of apparatus; the wheel mounting of either Fig. 1, Fig. 3 or Fig. 3A could be used on either light or heavy apparatus; other suitable side bar construction could be used; the side bar bend 21, Fig. 13, could be used on either heavy or light apparatus, and so on.

Other modes of applying the principle of the invention may be employed instead of the one explained, change being made as regards the mechanism herein disclosed, provided the means stated by any of the following claims or the equivalent of such stated means be employed.

We therefore particularly point out and distinctly claim as our invention:

1. An apparatus of the class described comprising a root-cutting blade of substantially U-shape in cross section, and a carriage supporting the same, said carriage comprising two parallel side bars, attaching means between each side bar and the upper part of its corresponding leg of the U, means for holding the front end of each bar off the ground, the portion of each bar at which the leg of the U is attached being directed tangentially to the bottom of the means for holding the front end of the bar off the ground.

2. An apparatus of the class described comprising a root-cutting blade of substantially U-shape in cross section, and a carriage supporting the same, said carriage comprising two parallel side bars, attaching means between each side bar and the upper part of its corresponding leg of the U, a wheel at the front end of each bar, and an upward bend at the rear end of each bar whereby the bar section to which the cutter is attached is located substantially on a geometrical tangent to said wheel.

3. An apparatus of the class described comprising a root-cutting blade of substantially U-shape in cross section, and a carriage supporting the same, said carriage comprising two parallel side bars, attaching means between each side bar and the upper part of its corresponding leg of the U, a wheel at the front end of each bar, and a section at the rear end of each bar, to which the cutter is attached, located on a tangent to such wheel.

4. A root-pruning apparatus comprising a carriage, a cutter attached therebelow, said cutter being U-shaped in transverse section and being of substantial length in its direction of travel, a pivotal connection between said cutter and said carriage and stop means operative in one direction only between said cutter and said carriage to prevent upward movement of said carriage about said cutter.

5. A root-pruning apparatus comprising a carriage, a cutter attached therebelow, said cutter being U-shaped in transverse section and being of substantial length in its direction of travel, a pivotal connection between said cutter and said carriage and means for effecting predetermined limitations in one direction only in the angular relation of said carriage to said cutter.

6. A root-pruning apparatus comprising a carriage, a cutter blade attached therebelow, said cutter being U-shaped in transverse section and being of substantial length in its direction of travel, a pivotal connection between said cutter and said carriage near the upper rear edge of each leg of the U, means for effecting predetermined variations in the depth of travel of the cutter, said means comprising a block adapted to be set in predetermined selected positions thereby limiting the angular relation of the carriage to the cutter.

7. A root-pruning apparatus comprising a carriage, a cutter attached therebelow, said cutter being U-shaped in transverse section and being of substantial length in its direction of travel, a pivotal connection between said cutter and said carriage near the upper rear edge of each leg of the U, means for effecting predetermined variations in the position of the cutter about such pivot, stopping means adapted to be set in predetermined selected positions thereby limiting the angular relation of the carriage to said cutter, and cam means for lifting the forward end of said cutter.

8. Root-pruning apparatus comprising, in combination, a blade of substantial length and of U-shaped transverse section, two forwardly extending bars, a pivot connecting each of said bars near the rear upper edge of its respective leg of the U, a second pivot in the upper edge of each of said legs forward of said connecting pivot, a blade depth adjusting block eccentrically mounted thereon in position to engage its respective one of said bars, thereby setting its respective bars at a predetermined angle to said blade, and means for lifting the front of the blade to remove the stopping means from contact with the bars.

9. Digging apparatus of the class described, comprising a carriage, a root cutter of substantially U-shaped cross section attached below said carriage, a front edge on said cutter inclining upwardly and rearwardly on each side, and an uprooting element attached to the bottom of said cutter, said element comprising a rigid frame having a base including a forward projection for attachment to the cutter, an upright at the rear of said base and a face inclining upwardly and to the rear from the base to the top of said upright.

10. An apparatus of the class described comprising a U-shaped cutting blade, a bar pivoted at its rear end to the upper portion of each leg of the U, an element on the front end of said bar adapted to bear on the ground, and means for limiting the movement of said blade about said pivot only in the direction of said bar towards the ground.

11. Root-pruning apparatus comprising, in combination, a blade of substantial length and of U-shaped transverse section, two forwardly extending bars, a pivot connecting each of said bars to said blade near one side of the upper edge of its respective leg of the U, means for maintaining the bars at a predetermined inclination to the blade during the operation of the apparatus, and means for altering the inclination between bars and blade without altering the predetermined setting of said maintaining means.

WILLIAM A. COLE.
RUTH COLE,
*Administratrix of the Estate of Gilbert S. Cole, Deceased.*